United States Patent Office 3,164,449
Patented Jan. 5, 1965

3,164,449
ANTHRAQUINONE DYES FOR GASOLINE
Edwin C. Buxbaum, Wilmington, Del., assignor to E. I. du Pont de Nemours and Company, Wilmington, Del., a corporation of Delaware
No Drawing. Filed Mar. 1, 1961, Ser. No. 92,465
11 Claims. (Cl. 44—59)

This invention relates to new dyes for petroleum products. More particularly, this invention relates to novel anthraquinone compounds and compositions of petroleum products and said anthraquinone compounds as coloring agents.

Heretofore anthraquinone dyes have been restricted in their application to coloring petroleum products because they have had a low solubility in organic solvents and gasoline and have had a tendency to crystallize and settle from the solutions of low concentration that could be prepared. Consequently, it has been difficult to provide a stable solution of even moderate concentration of such a dye, for example, as 1,4-dianilinoanthraquinone, from which the dye will not settle. Solid dyes of this type are preferably added to gasoline for coloring purposes as a concentrated solution to ensure immediate and uniform distribution of the dye in the gasoline. Such a solution must be capable of forming and of remaining as a single phase system without the separation of solid material.

Short-chain alkylaminoanthraquinones, such as 1,4-bis(butylamino)anthraquinone and 1,4-bis(pentylamino)anthraquinone are known to the art as colorants for gasoline. These compounds, however, crystallize from solution and are not adapted for providing stable concentrated (10% to 20% by weight) liquid solutions for advantageous ease of handling in coloring gasoline.

It is an object of this invention to provide new organic compounds which are useful as coloring agents for petroleum products. A further object is to provide dyes having high solubility and high tinctorial strength in petroleum products such as gasoline and organic solvents. Another object is to provide stable solutions of high concentration or solvent pastes of anthraquinone dyes that are suitable for coloring petroleum products. Other objects will appear hereinafter.

These and other objects of this invention are accomplished by providing novel organic compounds corresponding to the formula

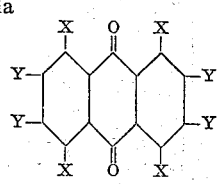

wherein X is a radical selected from the group consisting of hydrogen, bromine, chlorine, amino, hydroxy, alkylamino having from 1 to 5 carbon atoms, methoxy, ethoxy, 2-hydroxyethylamino, anilino, toluidino and a —NHR radical wherein R is an aliphatic hydrocarbon radical of from 8 to18 carbon atoms free from acetylenic unsaturation with the proviso that at least one of the X's but no more than two of them be a —NHR radical, Y is a radical selected from the group consisting of hydrogen, bromine, chlorine, amino, hydroxy, alkylamino having from 1 to 5 carbon atoms, methoxy, ethoxy, 2-hydroxyethylamino, anilino and toluidino, with the further proviso that the sum of X and Y, excluding hydrogen and —NHR radicals, is no greater than 4. The aliphatic hydrocarbon radical R in the above definition of from 8 to 18 carbon atoms which is free from acetylenic unsaturation is either an alkyl or an alkenyl radical. For purposes of the present invention, it is preferable to employ mixtures of two or more anthraquinone compounds falling within the scope of the above general formula and the primary use of these compounds or mixtures thereof is as coloring agents when added to petroleum products such as kerosene, diesel fuel, greases and particularly gasoline.

It is more preferable to employ in an anthraquinone mixture at least two anthraquinone compounds where the —NHR radical in each of the anthraquinone compounds in the mixture are different and the remaining X and Y members in each of the anthraquinone compounds in the mixture are the same, with the preponderant anthraquinone compound of the mixture being present in a maximum amount of no greater than 90% by weight.

Representative anthraquinone dyes of the invention are given below in the examples. They consist of mixtures of compounds comprising an anthraquinone nucleus having one or two aliphatic amino hydrocarbon groups of 8 to 18 carbon atoms free of acetylenic unsaturation, i.e., straight-chain or branched alkyl- or alkenylamino substituents in the 1-, 4-, 5- or 8-positions. By employing a mixture of long-chain aliphatic amino hydrocarbons, i.e., long-chain alkyl- and alkenylamines as a reactant for condensation with an anthraquinone having a halo- hydroxy-, nitro- or sulfo-substituent, a mixture of the novel aliphatic aminoanthraquinones of this invention is obtained. The mixed anthraquinone compounds are isolated or separated in solvent solution from the reaction mixture. The long-chain amine mixture provides amorphous anthraquinone derivatives that have essentially no tendency to crystallize, and the long-chain aliphatic amine radical markedly increases the solubility of the anthraquinone compounds containing it in petroleum products including gasoline. The long-chain aliphatic aminoanthraquinones are usually prepared in a solvent medium, and the resultant concentrated solution of the dye in the solvent varies from a free-flowing liquid to a paste, depending upon the nature and amount of solvent present and upon the composition of the mixture of aliphatic amines taken as the reactant. More concentrated free-flowing solutions of the new dyes can be made in o-dichlorobenzene than in toluene owing to their higher solubility in o-dichlorobenzene. The dyes are well adapted for coloring gasoline and have a solubility in organic solvents of the order of 10% to 20% by weight and higher. Also these dyes can be obtained as solvent pastes containing as much as 40% to 50% by weight of dye. The dyes have little or no tendency to crystallize and do not readily separate and settle from solution.

A liquid solution form of the dye is highly desirable and convenient for adding the dye to gasoline "on stream" and ensuring a rapid and uniform distribution of the coloring material throughout the bulk of the gasoline. Such a solution of the dye is easily filtered as a step in the manufacture of the dye solution to remove any insoluble matter, particularly inorganic salts which may be used or may be formed in making the dye. For example, it is desirable and sometimes specified that dyes for gasoline contain less than 2% matter that is insoluble in benzene.

The anthraquinone dye intermediates contain bromine, chlorine, hydroxy, nitro, or sulfo groups located on the alpha (i.e. 1, 4, 5, and 8 positions) positions of the anthraquinone nucleus which provide places for reaction of the anthraquinone dye intermediates with an aliphatic amine or mixture of amines to introduce the long-chain aliphatic amino groups. Specific intermediates that are suitable and illustrate those that may be employed are given in the examples. In addition to these substituents that are replaced during the amine reaction the anthraquinone may, and often does, contain substituents that are present in the final dye such as those identified as X and Y in the above general formula except additional —NHR groups.

The amine reactant can comprise a single aliphatic amine or a mixture of aliphatic amino hydrocarbons free of acetylenic unsaturation, i.e., mixtures of straight and branched-chained alkylamines or mixtures of straight and branched-chained alkylamines and alkenylamines. Each amine reactant has from 8 to 18 carbon atoms. The mixtures may contain varying amounts of all of the possible amines within this range of hydrocarbon chain length, or they may contain varying amounts of amines of a narrower chain length range that falls within the broad 8 to 18 carbon atom range. The particular chain length range that may be employed and the relative amounts of the separate amine components of the mixture are not critical. Preferably a mixture should comprise at least two amines of different chain length, and the preponderant amine should be present in a maximum amount of not greater than 90%.

Such amine mixtures can be prepared by mixing the separate amines. Preferably they are obtained as appropriate mixtures by reducing mixed nitriles of higher fatty acids, e.g., with metallic sodium and an alcohol in toluene as described in U.S. Patent 2,122,644. The nitriles can be obtained, in turn, by reacting higher fatty acids or their esters with ammonia at elevated temperatures as described in British Patent 697,293 and the following U.S. Patents 2,061,314; 2,414,393; 2,448,275; 2,546,521; and 2,555,606. The fatty acids from such oils and fats as soy bean oil, coconut oil, and animal tallow are suitable source materials of varying high carbon chain length from which the amines can be prepared. Amine mixtures which can be employed include:

Mixture A: Percent
 Octylamine _____ 8
 Decylamine _____ 9
 Dodecylamine _____ 47
 Tetradecylamine _____ 18
 Hexadecylamine _____ 8
 Octadecylamine _____ 5
 Octadecenylamine _____ 5
Mixture B:
 Tetradecylamine _____ 2
 Hexadecylamine _____ 24
 Octadecylamine _____ 28
 Octadecenylamine _____ 46
Mixture C:
 Hexadecylamine _____ 6
 Octadecylamine _____ 90
 Octadecenylamine _____ 4
Mixture D:
 Hexadecylamine _____ 20
 Octadecylamine _____ 17
 Octadecenylamine _____ 26
 Octadecadienylamine _____ 37
Mixture E:
 Hexadecylamine _____ 6
 Octadecylamine _____ 90
 Octadecenylamine _____ 4

The long-chain aliphatic amine derivatives of anthraquinone are made by condensing the corresponding amines with a halo-, hydroxy-, nitro-, or sulfo-anthraquinone by reactions that are well known in the art for the preparation of aminoanthraquinones as described and illustrated in Lubs, "Chemistry of Synthetic Dyes and Pigments," Reinhold Publishing Co., 1955, pp. 359–363. Such solvents as methanol, 1-propanol, o-dichlorobenzene, carbon tetrachloride, chloroform, tetrachloroethylene, petroleum naphtha, chlorobenzene, trichlorobenzene, nitrobenzene, toluene, nitrotoluene, and xylene can be employed to provide a reaction medium.

The following examples are illustrative of the novel products and compositions of this invention.

EXAMPLE I

To a solution of 63.2 parts of 1-methylamino-4-bromo-anthraquinone in 350 parts of o-dichlorobenzene were added one part of copper acetate, 25 parts of potassium acetate, and 104 parts of the Mixture A of amines given above. The reaction mass was then heated to a temperature between 160° and 165° C. and held at this temperature for ten hours. The reaction mass turned purple. While still hot (150° to 160° C.), the resultant solution was filtered to remove insoluble salts. The filtrate was a solution containing about 20% anthraquinone dye which comprises a mixture of compounds having the structure

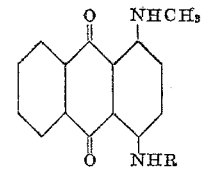

where R is an aliphatic hydrocarbon, i.e., alkyl or alkenyl radical of 8 to 18 carbon atoms free of acetylenic unsaturation. The dye solution was a low viscosity fluid well suited for coloring gasoline and when mixed with gasoline imparts to it a clear blue-violet color.

EXAMPLE II

To a solution of 100 parts of quinizarin (1,4-dihydroxyanthraquinone) in 480 parts of methanol were added 24 parts of borax, 46 parts of 30% aqueous hydrochloric acid, and 250 parts of the Mixture D of amines listed above. The temperature of the reaction mass was raised to between 50° and 55° C. over a period of one-half hour, and 8 parts of zinc dust was added by sprinkling it into the reaction vessel over a period of one-half hour. The temperature was then raised to that of the refluxing mass (67° to 69° C.) and maintained by refluxing for 14 hours. The reaction mass became purple in color. About 350 parts of the methanol was removed by distillation, and 600 parts of o-dichlorobenzene was added. The resultant solution was heated to about 145° C. for filtration to remove insoluble inorganic salts. It contained 35% anthraquinone dye which comprised a mixture of compounds having the structure

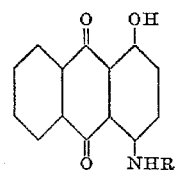

where R is hexadecyl, octadecyl, octadecenyl, and octadecadienyl in the proportions by weight of .2:.17:.26:.37, respectively. When used to color gasoline the dye in solution imparted a bright purple shade.

When Mixture A of the amines was employed in place of Mixture D in the above procedure, a solution of a similar purple dye was obtained with R groups varying from octyl through octadecyl and octadecenyl. Such a solution was equally effective for coloring gasoline.

EXAMPLE III

A solution of 33 parts of 4,5-dinitro-1,8-dihydroxy-anthraquinone and 66 parts of Mixture A of the amines listed above was heated at a temperature of between 120° and 130° C. for 9 hours during which time a deep blue color developed. The reaction mass was filtered hot to remove insoluble matter, and the resultant cooled filtrate containing about 20% dye was ready for coloring gasoline a blue shade. The dye comprised a mixture of anthraquinone compounds having the structure

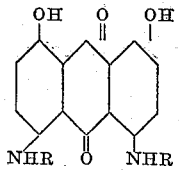

where R is an aliphatic hydrocarbon (alkyl or alkenyl) radical of 8 to 18 carbon atoms free of acetylenic unsaturation.

EXAMPLE IV

To a solution of 100 parts of quinizarin in 480 parts of 1-propanol were added 24 parts of borax, 46 parts of 30% hydrochloric acid, and 325 parts of the Mixture D of amines listed above. The reaction mass was heated to a temperature of between 55° and 60° C., and over a period of about one-half hour 8 parts of zinc dust was sprinkled into the reaction vessel. The temperature was then raised to 95° to 100° C. and held at this range for 12 hours. About 450 parts of 1-propanol was distilled from the reaction mass, 1000 parts of o-dichlorobenzene were added, and the temperature of the mixture was raised to between 140° and 150° C. The hot solution was filtered to remove insoluble inorganic matter, diluted with an additional 1700 parts of o-dichlorobenzene, and allowed to cool to room temperature. The resultant solution contained about 10% of a green-blue dye having the structure

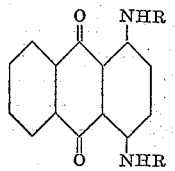

where R is as defined in Example 2. The dye had excellent solubility in gasoline and colored it green-blue.

When Mixture A of the amines was employed in place of Mixture D in the above procedure, a solution of a similar blue dye was obtained having R groups that varied from $C_8$ through $C_{18}$ alkyl and $C_{18}$ alkenyl. The dye exhibited high solubility in gasoline and colored it blue.

EXAMPLE V

To a solution of 250 parts of the Mixture E of amines comprising 6% hexadecylamine, 90% octadecylamine, and 4% octadecenylamine in 480 parts of methanol are added 24 parts of borax, 46 parts of 30% hydrochloric acid, and 100 parts of quinizarin. The temperature of the reaction mass is raised to between 50° and 55° C., and 8 parts of zinc dust is added over a half hour period. The temperature is then raised to 67° to 69° C. and the reaction mass held at this temperature for 16 hours. A blue color gradually forms in the reaction mass. About 460 parts of methanol are distilled off and 800 parts of o-dichlorobenzene are added to the dye mixture. The resultant solution with insoluble salts is heated to between 150° and 160° C. and filtered hot to remove the insoluble inorganic salts. The filtered solution is ready for coloring petroleum products in blue shades. It contains about 25% anthraquinone dye which comprises a mixture of compounds having the structure

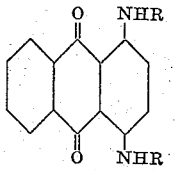

where R is hexadecyl, octadecyl, and octadecenyl in the proportion by weight of .06:.9:.04, respectively.

In addition to the anthraquinone dye intermediates employed in the above examples, the following intermediates can be employed for reaction with mixtures of the amines listed above to obtain additional long-chain alkyl- and alkenylaminoanthraquinone dyes for coloring petroleum products. The specific dye to be obtained and its color are also given in the following table.

| Anthraquinone reactant Compound | Anthraquinone Dye | Color |
|---|---|---|
| 1-Amino-4-bromo-2-methyl- | 1-Amino-2-methyl-4-RNH- | Blue. |
| 1-Amino-2,4-dibromo- | 1,Amino-2-bromo-4-RNH- | Blue. |
| 1-Amino-5-chloro- | 1-Amino-5-(RNH)- | Violet. |
| 1,5-Diamino-2,4,6,8-tetrabromo-. | 1,5-Diamino-2,6-dibromo 4,8-bis (RNH)-. | Blue. |
| 1-Chloro- | 1-RNH- | Red. |
| 1,5-Dichloro- | 1,5-bis (RNH) | Violet. |
| 1,8-Dichloro- | 1,8-bis (RNH)- | Violet. |
| 4-Chloro-1-hydroxy- | 4-RNH-1-hydroxy- | Violet. |
| 4,8-Dichloro-1,5-dihydroxy- | 4,8-bis (RNH)-1,5-dihydroxy-. | Blue. |
| 1,4,5,8-Tetrachloro- | 4,8-bis (RNH)-1,5-dichloro- | Violet. |
| 1,4-Dibromo- | 1,4-bis (RNH)- | Blue. |

R denotes the aliphatic hydrocarbon radicals of 8 to 18 carbon atoms contained in the reactant amine mixtures.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An amorphous mixture of at least two anthraquinone compounds having the formula

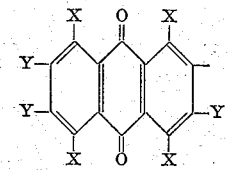

where at least one X but no more than two X's are —NHR radicals in which R is an aliphatic hydrocarbon radical of from 8 to 18 carbon atoms free from acetylenic unsaturation; and the remaining X and Y members are selected from the group consisting of bromine, chlorine, amino, hydroxy, alkylamino having 1–5 carbon atoms, methoxy, ethoxy, 2-hydroxyethylamino, anilino, toluidino and hydrogen, the sum of said remaining X and Y members selected from said group other than hydrogen is no greater than four, wherein the preponderant anthraquinone compound in said mixture is present in a maximum amount of no greater than 90% by weight.

2. An amorphous mixture of at least two anthraquinone compounds as described in claim 1 wherein the —NHR radicals in each of the anthraquinone compounds in said mixture are different and the remaining X and Y members in each of the anthraquinone compounds in said mixture are the same.

3. An amorphous mixture of anthraquinone compounds having the formula

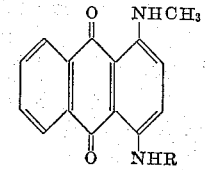

where R is aliphatic hydrocarbon radical of 8 to 18 carbon atoms free of acetylenic unsaturation the preponderant anthraquinone being present in a maximum amount of no more than about 90 percent by weight.

4. An amorphous mixture of anthraquinone compounds having the formula

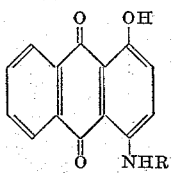

where R is aliphatic hydrocarbon radical of 8 to 18 carbon atoms free of acetylenic unsaturation the preponderant anthraquinone being present in a maximum amount of no more than about 90 percent by weight.

5. An amorphous mixture of anthraquinone compounds having the formula

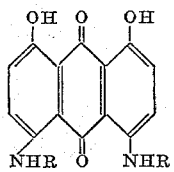

where R is aliphatic hydrocarbon radical of 8 to 18 carbon atoms free of acetylenic unsaturation the preponderant anthraquinone being present in a maximum amount of no more than about 90 percent by weight.

6. An amorphous mixture of anthraquinone compounds having the formula

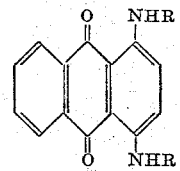

where R is aliphatic hydrocarbon radical of 8 to 18 carbon atoms free of acetylenic unsaturation the preponderant anthraquinone being present in a maximum amount of no more than about 90 percent by weight.

7. A colored composition consisting of a liquid hydrocarbon petroleum product and an amorphous mixture of anthraquinone compounds as defined in claim 2, said mixture of anthraquinone compounds being present in an amount sufficient to obtain a colored petroleum product.

8. A colored composition consisting of gasoline and an amorphous mixture of anthraquinone compounds as defined in claim 2, said mixture of anthraquinone compounds being present in an amount sufficient to obtain a colored gasoline.

9. A concentrate solution of an amorphous mixture of anthraquinone compounds as defined in claim 1, said concentrate solution consisting of from 10% to 50% by weight of the mixture of anthraquinone compounds in an organic solvent.

10. A concentrate solution of an amorphous mixture of anthraquinone compounds as defined in claim 1, said concentrate solution consisting of from 10% to 50% by weight of the amorphous mixture of anthraquinone compounds in an organic solvent selected from the group consisting of methanol, 1-propanol, o-dichlorobenzene, carbon tetrachloride, chloroform, tetrachloroethylene, petroleum naphtha, chlorobenzene, trichlorobenzene, nitrobenzene, toluene, nitrotoluene, and xylene.

11. A concentrate solution of an amorphous mixture of anthraquinone compounds as defined in claim 1, said concentrate solution consisting of from 10% to 50% by weight of the amorphous mixture of anthraquinone compounds in methanol.

References Cited in the file of this patent

UNITED STATES PATENTS

| | | |
|---|---|---|
| 2,426,577 | Scalera et al. | Aug. 26, 1947 |
| 2,485,764 | Ogilvie | Oct. 25, 1949 |
| 2,611,772 | Allen et al. | Sept. 23, 1952 |
| 2,848,462 | Gutzwiller | Aug. 19, 1958 |
| 2,925,333 | Thompson | Feb. 16, 1960 |